May 12, 1959 F. STADELMAN 2,886,195
APPARATUS FOR, DE-LIDDING AND DE-PANNING
BREAD LOAVES OR THE LIKE
Filed Jan. 16, 1956 5 Sheets-Sheet 4
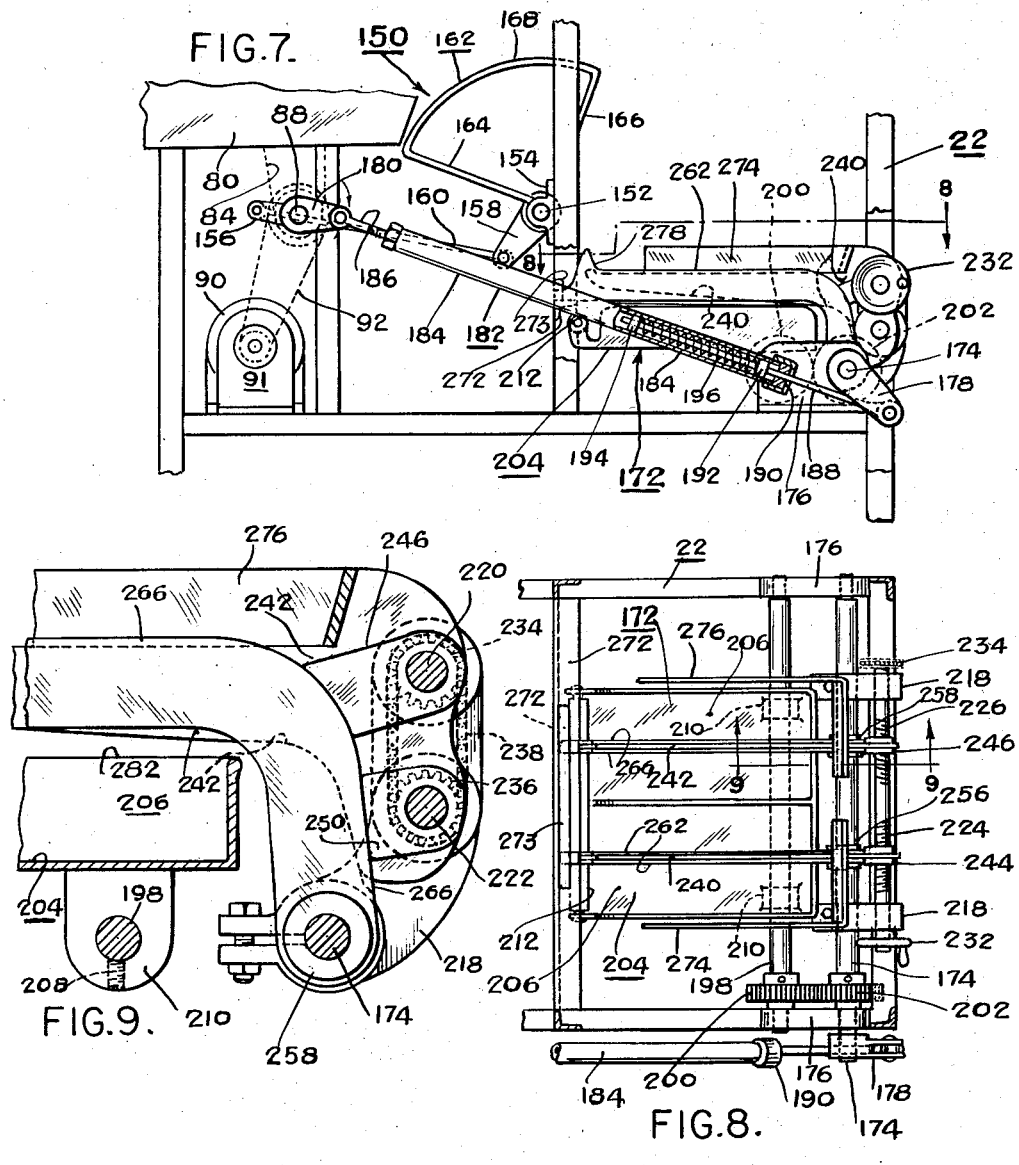
INVENTOR
FRANK STADELMAN
BY Arthur N. Klein
ATTORNEY May 12, 1959 F. STADELMAN 2,886,195
APPARATUS FOR, DE-LIDDING AND DE-PANNING
BREAD LOAVES OR THE LIKE
Filed Jan. 16, 1956 5 Sheets-Sheet 5
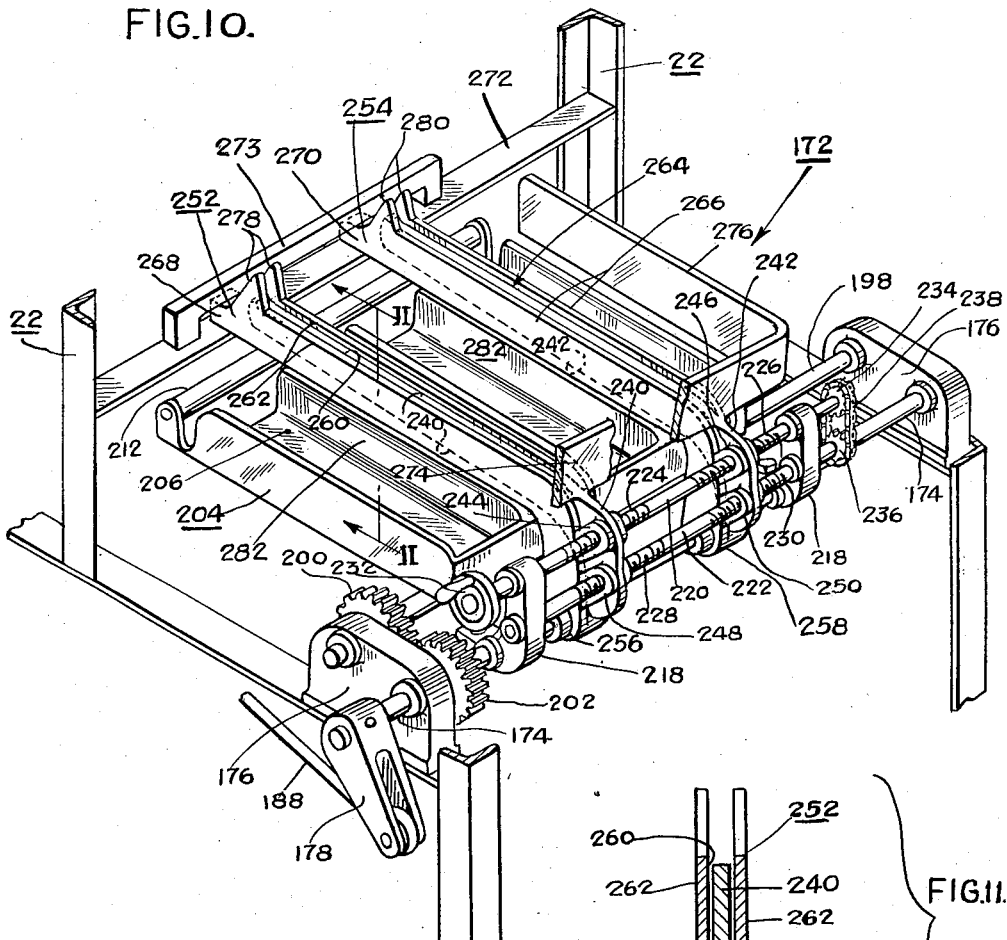
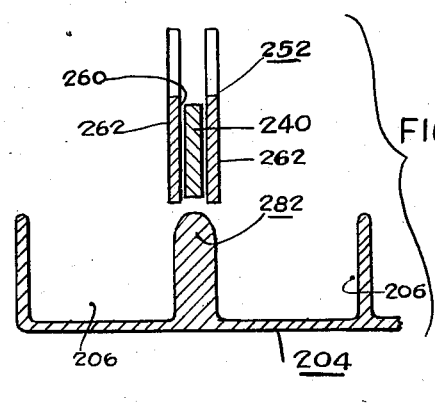
INVENTOR
FRANK STADELMAN
BY Arthur N. Klein
ATTORNEY _United States Patent Office_ 2,886,195
Patented May 12, 1959

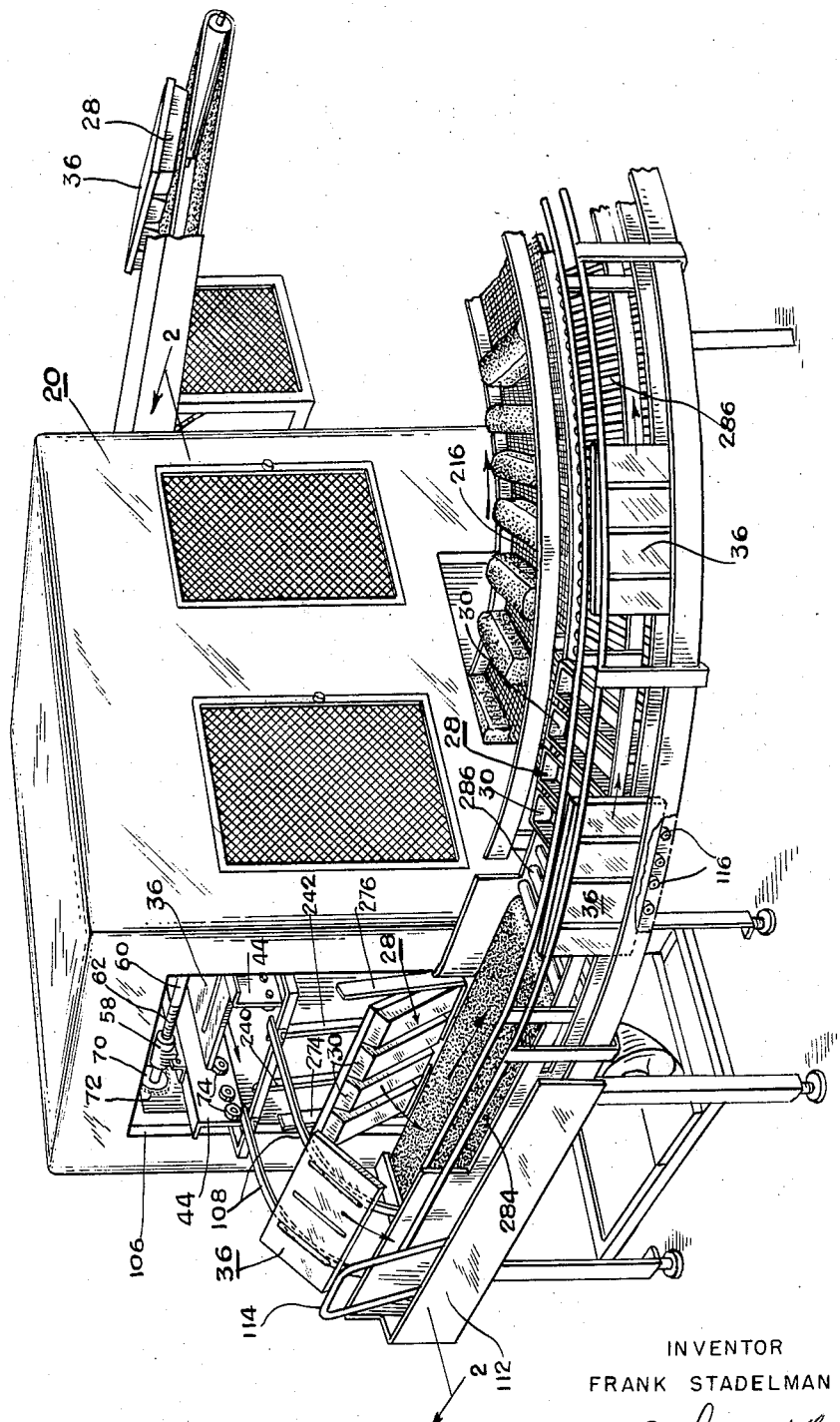

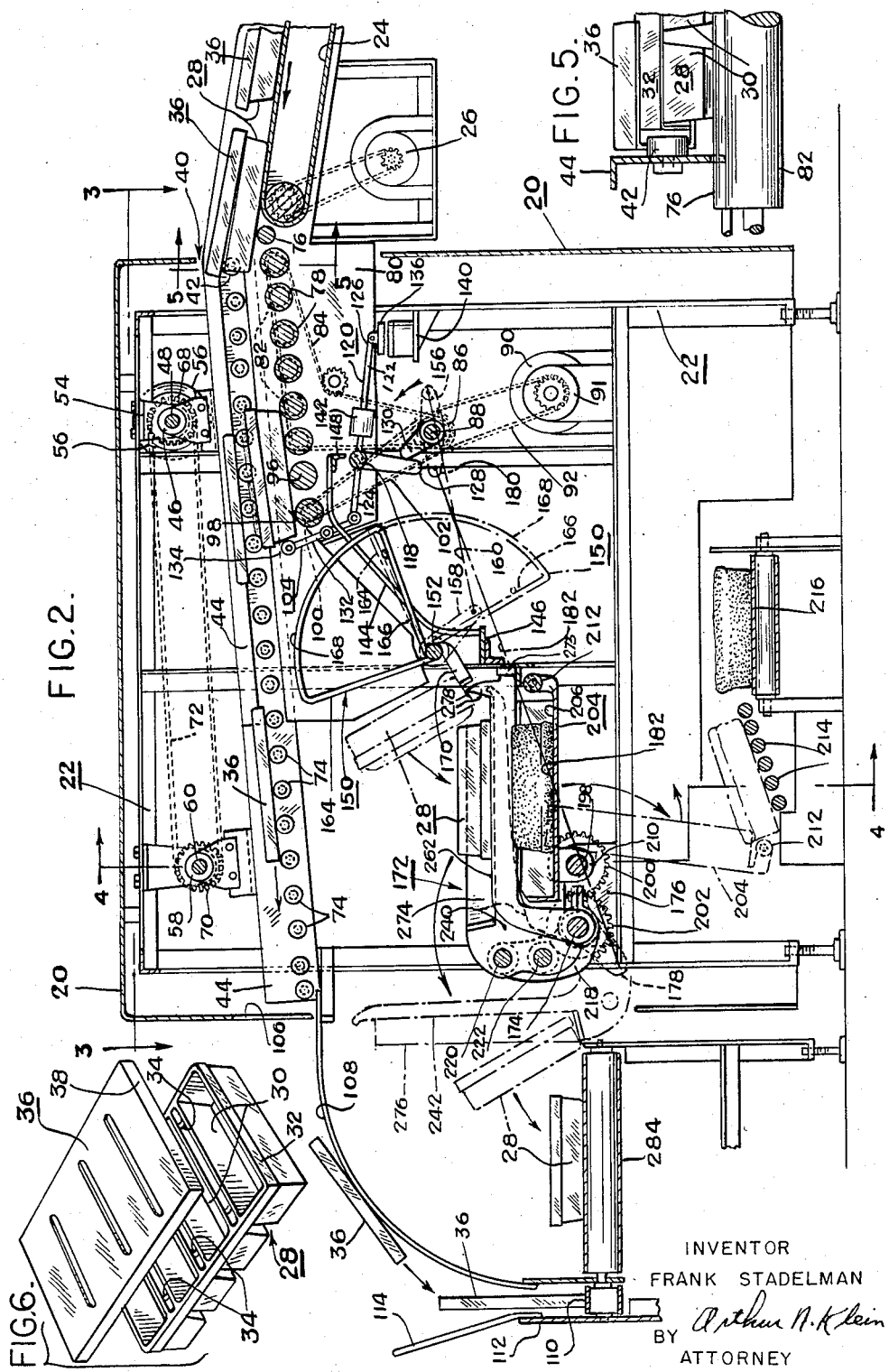

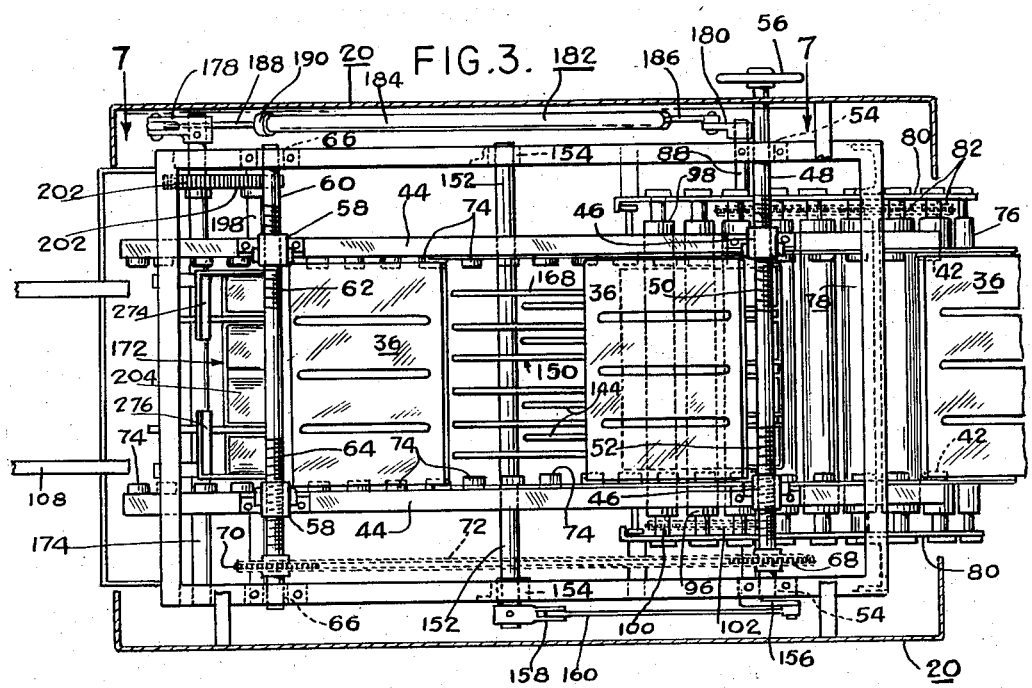

2,886,195

APPARATUS FOR DE-LIDDING AND DE-PAN-NING BREAD LOAVES OR THE LIKE

Frank Stadelman, Cranford, N.J., assignor to Latendorf Conveying Corporation, Bayonne, N.J., a corporation of New Jersey Application January 16, 1956, Serial No. 559,205

29 Claims. (Cl. 214—308)

The present invention relates generally to material handling apparatus and more particularly to apparatus, for use in bakeries and the like, for de-lidding and de-panning baked bread.

In bakeries, bread is ordinarily baked in pan straps comprising a plurality of side-by-side pans for individual loaves; the individual pans being connected into a more or less unitary assembly. The pan strap is provided with a lid which covers all of the individual pans, and which is relatively heavy; the extra weight helping to maintain uniform loaf-size during baking.

After baking has been completed, the covered pan strap is removed from the oven, after which its lid must be removed and the individual loaves of bread must be taken out.

Due to the weight of the lid and the frequent tendency of the baked loaves to stick or adhere to the individual pans, manual de-lidding and de-panning (i.e. removal of the baked loaves from the pan strap) is a difficult and time-consuming operation.

Various machines have heretofore been suggested for de-panning (after manual de-lidding), but these previously known de-panning machines have all been extremely complicated and costly and, in addition, have been objectionable in that an excessively high proportion of the baked loaves are bruised or broken during the dumping which constitutes part of the de-panning operation.

It is an object of the present invention to provide a new and improved method of, and apparatus for, de-lidding and de-panning bread in a single continuous automatic operation, wherein bruising or breaking of the dumped bread is minimized, and wherein the other shortcomings of the prior-art are overcome.

Other objects and advantages of the present invention are apparent in the following detailed description, appended claims and accompanying drawings.

For the purpose of illustrating the invention, there is shown in the drawings a form thereof which is presently preferred and which has been found in practice to give satisfactory results. It is to be understood, however, that this invention is not limited to the precise arrangements and instrumentalities disclosed.

Referring to the accompanying drawings in which like reference characters indicate like parts throughout:

Figure 1 is a perspective view of an automatic de-lidding and de-panning machine forming one embodiment of the present invention.

Figure 2 is a more or less schematic vertical cross-sectional view taken generally along line 2—2 of Fig. 1.

Figure 3 is a horizontal cross-sectional view taken generally along the line 3—3 of Fig. 2.

Figure 4 is a vertical cross-sectional view taken generally along the line 4—4 of Fig. 2.

Figure 5 is an enlarged fragmentary vertical cross-sectional view taken generally along the line 5—5 of Fig. 2.

Figure 6 is a perspective view of a pan strap and its lid, the lid being shown in removed position.

Figure 7 is a more or less schematic cross-sectional view taken generally along the line 7—7 of Fig. 3.

Figure 8 is a cross-sectional view taken generally along the line 8—8 of Fig. 7.

Figure 9 is an enlarged fragmentary vertical cross-sectional view taken generally along the line 9—9 of Fig. 8.

Figure 10 is an enlarged perspective view of the de-panning and bread-dumping mechanism; parts being broken away to reveal the construction thereof.

Figure 11 is a further enlarged vertical cross-sectional view taken generally along the line 11—11 of Fig. 10.

An automatic de-lidding and de-panning machine, forming a preferred embodiment of the present invention, is shown generally in Figs. 1 and 2.

This embodiment includes a generally enclosed housing 20 surrounding a frame 22 formed of appropriate structural members suitably interconnected, of which certain parts will be more specifically described hereinbelow.

An upwardly inclined conveyor belt 24, driven by a motor 26, is used to carry filled and lidded pan straps from the oven to the de-lidding and de-panning machine of this invention.

A pan strap 28 is shown in Fig. 6 and includes a plurality (for example four) of individual pan elements 30 (each intended to hold a single loaf of bread). The pan elements 30 are firmly held in somewhat spaced apart side-by-side relationship by a generally rectangular frame element 32 (which runs around the open upper ends of the pan elements) and a plurality of spacer elements 34 extending transversely intermediate the juxtaposed parallel edges of adjoining pan elements.

While the pan strap 28 is shown as having four individual pan elements, it is obvious that it can be made with a lesser or greater number of pan elements, as desired.

A lid 36, having a peripheral flange 38 of substantial thickness, is adapted to fit over the pan strap 28; the lid flange protruding beyond the pan strap as best indicated in Figs. 1, 2 and 5.

As each loaded and covered pan strap 28 reaches the top of the conveyor feed belt 24, its forward end extends within an entrance opening 40 formed in the housing 20, as shown in Fig. 2.

In this upwardly inclined position, the leading corners of the lid flange 38 ride over a pair of spaced roller wheels 42 mounted upon the inner faces of a pair of longitudinally extending downwardly inclined parallel track members 44, best shown in Figs. 2, 3 and 4.

The track members 44 are mounted so as to be laterally adjustable, toward and away from each other, to accommodate pan strap lids of different sizes.

Thus, the track members 44 are provided with a pair of aligned threaded collars 46 adjacent the uppermost ends of the track members. A transverse supporting shaft 48 having oppositely threaded portions 50 and 52 extends through the collars 46 and is rotatably mounted upon the frame 22 by bushings 54. One end of the shaft 48 protrudes from the housing 20 and is provided with an adjusting wheel 56.

It can be seen that because the threaded collars 46 on the two track members 44 are engaged with the oppositely threaded portions 50 and 52 respectively, manual rotation of the adjusting wheel 56 causes opposite lateral movement of the collars and the track members, so that the track members can be positioned closer to, or farther away from, each other, to accommodate different-size pan strap lids as mentioned above.

A similar pair of threaded collars 58 are provided adjacent the lower end of the track members 44 and a transverse supporting shaft 60, having oppositely threaded portions 62 and 64 extends through the collars 58; the ends of the shaft 60 being rotatably mounted upon the frame 22 by means of bushings 66.

The two shafts 48 and 60 are provided with longitudinally aligned sprocket wheels 68 and 70, respectively, which are connected by a sprocket chain 72, so that manual rotation of the shaft 48, described above, causes corresponding rotation of the shaft 60. Since the collars 58 on the shaft 60 engage with the oppositely threaded portions 62 and 64, rotation of the shaft 60 causes opposite lateral movement of the lower ends of the track members 44 in the same way as described above in connection with the shaft 48.

From the foregoing description, it can be seen that manual rotation of the adjusting wheel 56 causes the two track members 44 to move laterally toward or away from each other, while still maintaining their parallel relationship.

The track members 44 are provided with a series of aligned pairs of roller wheels 74 throughout substantially their entire longitudinal dimension.

With the leading edges of the lid flange 38 riding over the first pair of roller wheels 42 as described above, continued forward and upward movement of the pan strap along the feed belt 24 causes the bottom of the pan strap to ride over a transverse idler roll 76, which, as shown in Fig. 2, is located slightly above the level of the upper end of the belt 24. When more than half of the pan strap has passed beyond the idler roll 76, the force of gravity will cause the pan strap to tilt about the idler roll 76 from an upwardly inclined position to a downwardly inclined position and, as a result of this tilting, the pan strap is deposited upon the top of a plurality of transverse rollers 78 disposed below the level of the roller wheels 42 and 74 described above.

The plurality (for example six) of transverse rollers 78 have their ends rotatably mounted upon a pair of laterally spaced longitudinally extending supporting arms 80; successive rollers 78 being arranged along a forwardly and downwardly inclined angle which is slightly steeper than the forwardly and downwardly inclined angle formed by the successive pairs of roller wheels 74 described above.

As best shown in Fig. 3, one end of each of the rollers 78 is provided with a sprocket gear 82; the sprocket gears all being rotated in the same direction by a sprocket chain which, in turn, is driven by a sprocket gear 86 mounted on a power shaft 88.

As best shown in Figs. 2 and 4, the power shaft 88 is driven from a motor 90 through a sprocket chain drive 92.

The power shaft 88 extends transversely below the level of the rollers 78 and is rotatably mounted upon the frame by means of bushings 94.

A transverse idler roller 96 is mounted next to the lowermost of the power driven rollers 78 while a power driven transverse roller 98 is disposed next to the idler roller 96. The roller 98 is provided with a sprocket gear 100 (preferably located at the end opposite the sprocket gears 82 mentioned above, as best shown in Fig. 3) which is driven from the power shaft 88 by a separate sprocket chain 102.

For reasons which will be apparent, the roller 98 is preferably driven at a higher speed than the rollers 78.

The ends of the rollers 96 and 98 are also journalled upon the supporting arms 80 mentioned above, as shown in Figs. 3 and 4.

After the pan strap pivots about the idler rollers 76 and falls upon the power rollers 78, it is moved forwardly and downwardly along the successive rollers 78, the idler roller 96 and the power roller 98 until it strikes a pan stop 104, to be described hereinbelow.

During this forward and downward movement of the pan strap, the lid, riding over the roller wheels 42 and 74, also moves forwardly and downwardly but at a lesser angle so that it is gradually lifted off the pan strap, whereupon it slides freely downwardly over the successive pairs of roller wheels 74 until it emerges from an outlet opening 106 in the housing 20 and slides onto a pair of laterally spaced curved straps 108 which enable the lid to fall edgewise onto a relatively narrow power driven conveyor belt 110 set between spaced upright supporting walls 112, as best shown in Figs. 1 and 2. The outer of the two upright walls 112 may be provided with a guard 114 which guides the lid into position upon the conveyor belt.

The conveyor belt 110 moves the lid, in edgewise position, onto a series of idler roller wheels, set along a gradually downwardly inclined curved path, so that the lids are returned to a station (not shown) adjacent the oven for re-use.

The pan stop 104 referred to above is best shown in Figs. 2 and 4 and includes a horizontal transverse rotatably mounted shaft 118 disposed somewhat below the idler roller 96; the shaft 118 supporting, and serving as the pivot point for, a generally horizontal lever assembly 120. The lever assembly includes a pair of laterally spaced generally parallel and horizontal arms 122, of which one is shown in Fig. 2. The front portion 124 of each arm 122 is somewhat shorter than the rear portion 126.

Each arm 122 is provided with a generally vertical cam follower arm 128 which extends downwardly at right angles to the arm 122 from the pivot point thereof.

The power shaft 88 is provided with a pair of cam arms 130 (of which one is shown in Fig. 2), each cam arm 130 being in alignment with one of the cam follower arms 128.

Thus, as the power shaft 88 rotates (counterclockwise in Fig. 2) the cam arms 130 intermittently contact the cam follower arms 128 and cause opposite (i.e. clockwise in Fig. 2) pivotal movement of the cam follower arms and the lever assembly 120. After the cam arms 130 ride past the cam follower arms 128 the lever assembly 120 returns to counterclockwise-rotated position by gravity, as will be hereinafter described.

A pair of laterally spaced generally vertical upwardly extending arms 132 (of which one is shown in Fig. 2) are mounted at the forward ends of the front lever arm portions 124; the upper ends of the vertical arms 132 carrying a generally horizontal transverse pan stop rod 134.

As can be seen from Fig. 2, when the lever assembly 120 is in clockwise-rotated position, the pan stop rod 134 is elevated to a level somewhat above that of the power roller 98 so as to halt forward movement of the pan strap 28 with the leading edge of the pan strap protruding slightly beyond the power roller 98, as indicated in Fig. 2. However, when the lever assembly 120 is in counterclockwise-rotated position, the pan stop rod 134 is lowered to a level below that of the power roller so as to free the pan strap 28 for further forward and downwardly inclined movement, as will be described below.

A generally horizontal transverse iron rod 136 is mounted at the rearmost ends of the rear lever arm portions 126. When the lever arm assembly 120 is moved to the clockwise-rotated position of Fig. 2 the iron rod 136 is brought into contact with a pair of magnets 138 (of which one is shown in Fig. 2) mounted on a shelf 140 forming part of the frame 22. The magnets 138 serve as dampers to minimize any tendency of the pan stop assembly to jiggle or bounce when in elevated pan-arresting position.

The rear lever arm portions 126 may be provided with counterweights 142. However, the lever assembly is still weighted so as to rotate counterclockwise when the cam arms 130 ride past the cam follower arms 128; this tendency to rotate counterclockwise being sufficiently great to overcome the pull of the magnets 138 so that, after the cam arms 130 ride beyond the cam follower arms 128, as mentioned above, the lever assembly frees itself from the pull of the magnets 138 and moves, by gravity, to counterclockwise-rotated position.

As the pan stop 104 is retracted from the pan-arresting position shown in Fig. 2, the pan strap 28 is free to be moved forward by the power roll 98 and is deposited upon a bed formed by a plurality (for example four) of laterally spaced forwardly and downwardly inclined stationary rods 144 which are supported, at their lower and upper ends, by frame shelf members 146 and 148 respectively, best shown in Fig. 2.

The pan strap 28 is lifted from the bed rods 144 by a turn-over mechanism 150, shown in Figs. 2, 3, 4 and 7.

The turn-over mechanism 150 includes a transverse horizontal shaft 152 rotatably mounted upon the frame 22 by bushings 154. The shaft 152 is constructed and arranged to be reciprocably rotated from the power shaft 88 through a crank arm 156 mounted at one end of the shaft 88, a crank arm 158 mounted at the corresponding end of the shaft 152 and a connecting rod 160, as best shown in Fig. 3.

Mounted upon the shaft 152 is a plurality (for example six) of laterally spaced generally sector-shaped members 162 disposed in intermeshing relationship with the stationary bed rods 144 referred to above.

Each sector-shaped member 162 may be formed from a single rod which is bent so as to provide straight generally radial portions 164 and 166 connected by an outermost arcuate portion 168.

The turn-over mechanism 150 also includes a transverse stop shoulder 170 mounted on the opposite side of the shaft 152 from the sector-shaped members 162 mentioned above.

When the turn-over mechanism 150 is in its clockwise-rotated position (shown in dash-dot lines in Fig. 2), the sector-shaped members 162 are disposed below the level of the stationary bed rods 144 so that the pan strap 28 is deposited upon the stationary bed rods and slide downward therealong until its forward edge contacts the stop shoulder 170.

When the turn-over mechanism 150 is then rotated counterclockwise to the position shown in solid lines in Fig. 2, the radial portions 164 of the sector-shaped members 162 lift the pan strap 28 up from the forwardly and downwardly inclined stationary bed rods 144 and turn it over (through an angle of about 90°) so that the pan strap falls, in inverted position, upon a depanning assembly 172 with sufficient force to dislodge the loaves from the individual pan elements 30 (the vertical walls of which are preferably downwardly and inwardly tapered to facilitate dumping), as will be more fully described below.

The rotatable shaft 152 of the turn-over mechanism 150 is so geared in relation to the pan stop 104 that the sector-shaped members 162 remain in the raised counterclockwise-rotated position (shown in solid lines in Fig. 2) until after the pan stop mechanism 104 is moved to its retracted position (wherein the pan stop rod 134 is below the level of the power-roller 98 as described above). This arrangement eliminates the possibility of a pan strap moving past the retracted pan stop rod 134 and falling upon the stationary bed rods 44 at an inappropriate time (as for example at a time when the sector-shaped members 162 have already begun their counterclockwise turn-over movement). Thus, if a pan strap should move past the power-roller 98 at a time when the pan stop rod 134 is in its retracted position, the pan strap can move only slightly beyond the power-roller 98 and until the leading edge of the pan strap contacts the arcuate portions 168 of the sector-shaped members 162. The pan strap will be held in this position by said arcuate portions until the shaft 152 has rotated (clockwise in Fig. 2) sufficiently to bring the front radial portions 164 of the sector-shaped members 162 below the level of the pan strap bottom, whereupon the pan strap slides smoothly onto the forwardly and downwardly inclined stationary bed rods 144 (with its leading edge contacting the stop-shoulder 170), in which position it is ready to be picked up and turned over upon the reverse (i.e. counterclockwise in Fig. 2) rotation of the shaft 152 and sector-shaped members 162.

The de-panning or knock-out assembly 172 is best shown in Figs. 7–11 and includes a transverse horizontal shaft 174 rotatably journaled within bearing members 176 mounted on the frame 22, as best shown in Fig. 10. The shaft 174 is reciprocably rotated from the power shaft 88 by mechanism which includes aligned crank arms 178 and 180 mounted at corresponding ends of the shafts 174 and 88 respectively, and a connecting rod assembly 182.

The connecting rod assembly 182 incorporates lost-motion mechanism which permits a delayed "dwell" of the shaft 174 in a specified position to be hereinafter described.

The aforesaid lost-motion mechanism includes a cylinder 184 whose upper rearmost end is pivotally connected to the power shaft crank arm 180 by an extension 186.

A connecting rod 188 is pivotally secured, at one end, to the crank arm 178 and extends telescopically into the cylinder 184 through an apertured cap 190 mounted on the lower forward end of said cylinder. The rod 188 carries a piston or plunger 192 which moves slidably within the lower portion of the cylinder 184.

Fixedly mounted within said cylinder 184 at a point spaced somewhat above the lower forward end of said cylinder is a plate 194 having a central opening which serves as a guide for the upper free end of the connecting rod 188. A helical compression spring is disposed within the lower forward end of the cylinder 184 surrounding the connecting rod 188, as best shown in Fig. 7. The upper end of the spring 196 is supported by the plate 194 while the lower end of the spring bears against the piston 192 and urges the piston to lowermost position within the cylinder, wherein the connecting rod 188 is in relatively extended position with respect to the cylinder.

However, when the connecting rod assembly 182 reaches the position shown in Fig. 7, the shaft 174 encounters resistance (as will be described hereinbelow) so that it cannot rotate any further counterclockwise. For a short time thereafter continued rotation of the power shaft 88 and crank arm 180 causes the cylinder 184 to move telescopically with relation to the connecting rod 188 (against the pressure of the spring 196). Upon the start of the return movement of the crank arm 180, this relative telescopic movement of the cylinder 184 and connecting rod 188 is reversed until said cylinder and connecting rod return to their original relatively extended position shown in Fig. 7, after which clockwise rotation of the crank arm 178 and shaft 174 is initiated.

Rotatably mounted within the bearing members 176 is a second horizontal transverse rotatable shaft 198. The shaft 198 carries a toothed gear 200 which meshes with a slightly larger aligned gear 202 mounted on the main shaft 174.

As the shaft 174 is reciprocably rotated, as described above, the gears 200 and 202 cause the second shaft 198 to rotate reciprocably but oppositely and (because of the smaller size of the gear 200) through a somewhat larger arc.

Mounted on the shaft 198 is a bread catcher 204 having a plurality of individual elongated open-top side-by-side compartments 206 into which the individual loaves of baked bread are adapted to fall, in upside-down position, when knocked out of the pan strap as will be described hereinbelow.

The bread catcher 204 is fastened for rotation with the shaft 198 by means of set screws 208 mounted in apertured shoulders 210, through which the shaft 198 extends, as shown in Fig. 9.

A horizontal bumper bar 212 extends transversely across the opposite end of the bread catcher 204.

As a result of reciprocable rotation of the shaft 198, the bread catcher 204 oscillates between an uppermost generally horizontal bread-receiving position and a lowermost generally vertical bread-dumping position. The uppermost horizontal bread-receiving position of the bread catcher 204 is shown in Figs. 4 and 7–11 and is also shown in solid lines in Fig. 2. The lowermost generally vertical bread-dumping position is shown in dash-dot lines in Fig. 2.

As indicated in Fig. 2, the bread catcher oscillates through slightly more than 90° so that, in its lowermost position it is swung slightly beyond a true vertical line. Thus, the individual loaves of bread are free to tilt, under the attraction of gravity, about the bumper bar 212 and to fall rightside-up upon a series of transversely extending generally horizontal idler rollers 214 which lead rearwardly and upwardly to a power driven conveyor belt 216.

Upon return movement of the bread catcher 204 (i.e. counterclockwise in Fig. 2), the bumper bar 212 sweeps in an arc and gently pushes the individual loaves up along the rollers 214 and onto the conveyor belt 216 which then removes the loaves, as shown in Figs. 1, 2 and 4, carrying them to any conventional wrapping machine (not shown).

Mounted upon the main shaft 174 of the de-panning assembly 172 are a pair of side-by-side laterally adjustable units which operate to receive the pan strap from the turn-over mechanism 150, knocking the bread loaves free from the pan strap and enabling them to fall into the bread catcher 204 described above, and which subsequently remove and re-invert the empty pan strap and deposit it upon a take-off conveyor. Thus, a pair of supporting members 218 are mounted upon the main shaft 174 and are keyed to said shaft for pivotation therewith.

The supporting members 218 are bent so that, in the position shown in Figs. 7, 9 and 10, and also as shown in solid lines in Fig. 2, the main portions of the supporting members 218 extend more or less vertically upward, and are displaced slightly forward, from the shaft 174.

Journaled within the supporting members 218 are upper and lower transverse horizontal shafts 220 and 222 respectively. The upper shaft 220 is provided with oppositely screw-threaded portions 224 and 226 while the lower shaft 222 is provided with similar oppositely threaded portions 228 and 230.

An adjusting wheel 232 is mounted at one end of the upper shaft 220 while a sprocket gear 234 is mounted upon the other end of said upper shaft 220. The lower shaft 222 is provided with an aligned sprocket gear 236; the gears 234 and 236 being connected by a sprocket chain 238. It can be seen that manual rotation of the adjusting wheel 232 causes the shafts 220 and 222 to rotate together at the same speed and in the same direction.

A pair of laterally spaced lift arms 240 and 242 are mounted upon the shafts 220 and 222 by means of internally threaded sleeves which make engagement with the oppositely threaded portions of said shafts. Thus, the lift arm 240 is provided with threaded sleeves 244 and 246 which engage with the threaded portions 224 and 228 of the shafts 220 and 222 while sleeves 248 and 250 of the lift arm 242 engage with the oppositely threaded portions (226 and 230) of said shafts 220 and 222. It can be seen that manual rotation of the adjusting wheel 232, producing rotation of the shafts 220 and 222 as described above, causes the lift arms 240 and 242 to shift along the oppositely threaded portions of the shafts 220 and 222 and to move toward or away from each other, so as to provide lateral adjustability.

Mounted upon the main shaft 174 are left and right knock-out bar assemblies 252 and 254.

The knock-out bar assembly 252 is mounted upon the shaft 174 by a loose bearing sleeve 256 which permits the shaft 174 to rotate freely relative to the sleeve and also permits the sleeve to move freely axially along said shaft. The knock-out bar assembly 254 is provided with a similar loose bearing sleeve 258.

The knock-out bar assembly 252 extends upward from the sleeve 256 and is bent to extend generally horizontally and rearwardly across the top of the bread catcher 204. The knock-out bar assembly is slotted, as at 260, along its upwardly extending and horizontal portions, to provide a pair of relatively thin transversely spaced arm portions 262, as best shown in Figs. 10 and 11. The other knock-out bar assembly 254 is similarly slotted as at 264 to provide laterally spaced arm portions 266.

The free ends 268 and 270 of the knock-out bar assemblies 252 and 254 respectively, rest slidably upon a transverse supporting track 272 forming part of the frame 22 and disposed slightly rearwardly of the rear end of the bread catcher 204. The track 272 is provided with an upper retaining yoke 273 which fits over the free ends 268 and 270 and holds them securely against upward as well as downward displacement.

The lift arms 240 and 242 extend within the slots 260 and 264 of the knock-out bar assemblies 252 and 254 respectively. As best indicated in Fig. 11, the horizontal portions of the lift arms 240 and 242, when in lowermost horizontal position, are fully enclosed within the slots 260 and 264 so that the upper edges of the lift arms are slightly below the upper edges of the spaced arm portions 262 and 264 of the knock-out bar assemblies 252 and 254.

Since the knock-out bar assemblies 252 and 254 are free to move slidably along the shaft 174, as described above, it is apparent that transverse movement of the lift arms 240 and 242, produced by operation of the adjusting wheel 232, causes corresponding movement of the slotted knock-out bar assemblies, within which they extend.

It can be seen, therefore, that manual adjustment of the wheel 232 causes the left and right knock-out bar assemblies, as well as the left and right lift arms, to move laterally toward and away from each other, so as to accommodate pan straps of different size.

The knock-out bar assemblies 252 and 254 may also be provided with peripheral flange members 274 and 276 which serve to receive and hold the inverted pan strap securely in place when deposited upon the knock-out bar assemblies by the turn-over mechanism 150.

Retaining shoulders 278 and 280 are also provided upon the free ends 268 and 270 respectively to hold the pan strap securely in place during operation of the lift arms 240 and 242, as will be described hereinbelow.

As can be seen in Fig. 11, each of the pairs of spaced arm portions of the knock-out bar assemblies is disposed directly above one of the vertical intermediate partition walls 282 of the bread catcher 204 to enable the loaves to fall from the inverted pan strap into the individual bread catcher compartments 206.

Fig. 11 shows the lowermost generally horizontal position of the lift arms 240 (and 242) and the uppermost generally horizontal position of the bread catcher 204. It will be noted that, in this limiting position, the lift arms are fully enclosed within the spaced arm portions of the knock-out bar assemblies 252 and 254, while the top of the bread catcher 204 is spaced slightly below the knock-out bar assemblies. The aforesaid limiting positions of the lift arms and the bread catcher are determined by contact of the sleeves 244, 246, 248 and 250 with the adjoining edges of the two spaced arm portions 262 and 266 of the knock-out bar assemblies 252 and 254, as shown in Figs. 9 and 10.

As best shown in Fig. 9, said sleeves are provided with enlarged extensions projecting in the direction of the knock-out bar assemblies, and these extensions contact the adjoining edges of the spaced arm portions when the shaft 174 is rotated counterclockwise in Figs. 9 and 10.

By reason of the meshing gears 200 and 202, this contact halts further rotation of both shafts 174 and 198, to stop the lift arms and bread catcher in the positions of Figs. 10–11.

It is when the rotation of the shaft 174 has thus been halted that the above-described lost-motion operation of the connecting rod assembly 182 begins.

As indicated in Fig. 2, the turn-over mechanism 150 deposits the pan strap, in inverted position, upon the knock-out bar assemblies 252 and 254 which have previously been adjusted (by operation of the wheel 232) to make the arm portions 262 and 264 coincide with the spaced elements 34 of the pan strap 28 so that the arm portions 262 and 264 do not block the individual pan elements 30.

The pan strap is deposited upon the knock-out bar assemblies with considerable force which is sufficient to jar the loaves free from the tapered pan elements, enabling them to fall free, in inverted position, from the pan strap, past the knock-out bar arm portions and into the compartments 206 of the bread catcher.

Rotation of the bread catcher (clockwise in Fig. 2) then causes the loaves to be dumped, rightside-up, onto the rollers 214, and then shoved onto the conveyor belt 216, as described above.

After the pan strap has been deposited upon the knock-out bar assemblies and the loaves freed therefrom, the lift arms 240 and 242 swing upward (counterclockwise in Fig. 2) from their lowermost horizontal position to the vertical position shown in dash-dot lines in Fig. 2. This lifts and tilts the empty pan strap and deposits it, in rightside-up position, upon a take-off conveyor belt 284, which, as shown in Figs. 1 and 2, moves the empty pan strap to a downwardly inclined curved flight of idler rollers, along which the empty pan straps move to a station (not shown) for re-use.

While the manner of operation of the various parts of my novel de-lidding and de-panning mechanism has already been set forth, a brief description, by way of summary, of the composite de-lidding and de-panning operation should be helpful at this point.

A pan strap 28 containing a plurality (for example four) of baked bread loaves and covered by a lid 36 is deposited upon the lower end of the conveyor feed belt 24 either manually or by another conveyor (not shown) which brings the pan strap from the baking oven.

The filled lidded pan strap moves forwardly and upwardly along the inclined feed belt 24 until its forward edge enters the housing entrance opening 40 and the edges of the lid ride over the roller wheels 42, while the bottom of the pan strap rides over the idler roller 74 until it pivots about the roller 74 until it rests, in forwardly and downwardly inclined position, upon the rollers 78. During the tilting of the pan strap 28, its lid 36 also tilts about the roller wheels 42 until it rests, in forwardly and downwardly inclined position, upon the adjoining roller wheels 74.

From the above-described positions, the pan strap 28 moves forwardly and downwardly along the power-driven rollers 78, while the lid, resting on the roller wheels 74, is gradually raised, relative to the pan strap, due to the fact that the rollers 78 are mounted at a steeper angle than the roller wheels 74.

When the lid 36 is raised completely off the pan strap 28, the lid is free to slide, by gravity, down the flight of roller wheels 74, emerging from the housing outlet opening 106, until it moves downward upon the curved convex straps 108 and, guided by the guard 114, is deposited edgewise upon the conveyor take-off belt 110, which moves it, between upright walls 112, to the downwardly flight of idler roller wheels, down which the lid slides to a station for re-use.

In the meantime, the de-lidded pan strap 28 has been moving forwardly and downwardly (at a level below that of the lid roller wheels 74) along the power rollers and across the idler roller 96 and the end power roller 98 until its leading edge contacts, and is halted by, the uppermost horizontal rod 134 of the raised pan stop 104 (the rod 134 and the front vertical arms 132 having earlier been raised by the action of the lever assembly 120; the shaft 118 and the cam follower arms 128, reciprocated by the cam arms 130 on the power shaft 88 as described above).

Subsequent lowering of the pan stop 104 permits the pan strap 28 to move forwardly (under the action of the power roller 98) until it is deposited upon the stationary bed rods 144 of the turn-over mechanism 150. If the pan stop 104 is lowered before the sector-shaped members 162 of the turn-over mechanism 150 have been lowered to their horizontal retracted position, the pan strap moves forward beyond the pan stop rod 134 only a short distance until the forward edge of the pan strap contacts, and is halted by, the arcuate portions 168 of said sector-shaped members; the pan strap 28 being held in this last mentioned position until the sector-shaped members 162 are lowered sufficiently to permit the pan strap to slide onto the stationary bed rods 144 as described above.

Upward movement of the sector-shaped members (actuated through the shaft 152, the crank arm 158, the connecting rod 160 and the crank arm 156 on the power shaft 88, as described above) then raises the pan strap 28 from the stationary bed rods 144 and, with the forward edge of the pan strap supported by the stop-shoulder 170, turns the pan strap over and deposits it, upside-down, upon the spaced arm portions 262 and 266 of the laterally adjustable knock-out bar assemblies 252 and 254.

As described above, the knock-out bar assemblies 252 and 254 are laterally adjustable toward and away from each other (through operation of the adjusting wheel 232, causing simultaneous rotation of upper and lower shafts 220 and 222 to produce opposite lateral movement of the internally threaded sleeves 244—246 and 248—250 which engage the oppositely-threaded portions 224 and 226 and 228 and 230 of the shafts 220 and 222; opposite lateral movement of said sleeves causing corresponding lateral movement of the lift arms 240 and 242 which, being disposed within the slots 260 and 264 of the spaced arm portions 262 and 266, cause corresponding opposite lateral movement of the knock-out bar assemblies 252 and 254, as described above) so that their arm portions 262 and 266 contact the spacer elements 34 of the inverted pan strap 28 without blocking any of the individual tapered pan elements 30.

The rather considerable force with which the inverted pan strap 28 is deposited upon the arm portions 262 and 266 of the knock-out bar assemblies 252 and 254 is sufficient to jar the loaves free of the pan elements 30, enabling them to fall, upside-down, between the arm portions 262 and 266 and into the individual compartments 206 of the horizontal bread catcher 204.

The lift arms 240 and 242 are then swung upward from their lowermost horizontal position, below the tops of the spaced arm portions 262 and 266 (through the action of the shaft 174, the crank arm 178, the connecting rod assembly 182 and the crank arm 180 on the power shaft 88) to raise the inverted pan strap from the arm portions 262 and 266 and, turning it over, to deposit it rightside-up upon the take-off conveyor belt 284, which moves the pan strap to the downwardly-inclined flight of idler rollers 286 along which the pan strap slides to a re-fill station (not shown).

During the aforesaid lifting rotation of the shaft 174 and arms 240 and 242, the shaft 198 has also been rotated (from the shaft 174 through the meshing gears 200 and 202) but in the opposite direction, to cause the bread catcher 204 to swing downward from its uppermost horizontal position to its slightly-beyond-vertical position, wherein the loaves fall out, by gravity, pivoting about the bread catcher's bumper bar 212, to swing gently onto the idler rollers 214, which are only slightly below the level of the bumper bar in said dumping position.

During the initial portion of the return pivotal movement of the bread catcher 204, the bumper bar 212 gently shoves the loaves rearwardly and upwardly along the idler rollers and onto the conveyor belt 216 which carries the loaves away to a wrapping station (not shown); the bread catcher continuing its return pivotation until it reaches its original horizontal position directly below the knock-out bar assemblies; the "lost motion" provided by the connecting rod assembly 182 enabling the bread catcher to dwell momentarily in its uppermost horizontal position.

While the bread catcher 204 is swinging upward from its vertical dumping position, the knock-out bar assemblies 252 and 254 are swinging downward from their uppermost generally vertical pan strap removing position to their original generally horizontal position, wherein the arm portions 240 and 242 are recessed within the slots 260 and 264 in the spaced arm portions 262 and 266 of the knock-out bar assemblies, so that the two assemblies are ready, more or less simultaneously, to receive and de-pan the next pan strap.

A variable-speed transmission unit 91, of conventional construction, may be positioned between the motor 90 and the sprocket chain 92 driving the power shaft 88, as shown in Fig. 2. In this way, the speed of operation of the entire de-lidding and de-panning machine can be varied. Due to the simplicity of construction and the direct drive mechanisms employed, a relatively high speed of operation is possible. Thus 30 to 40 pan straps (containing 120 or more baked loaves of bread) per minute, and even greater capacities, can be handled.

From the foregoing description, it is apparent that the novel machine of the present invention takes filled and lidded pan straps and, completely automatically, removes the lids, returning them to a re-use station, empties the de-lidded pan straps, returning the empty pan straps for re-use and sending the loaves to a wrapping station, all as parts of a generally integral and unitary process requiring only a fraction of the time needed by conventional methods heretofore employed.

By operation of only two adjusting wheels (56 and 232), the machine can be set instantly to accommodate pan straps and lids of different sizes.

The cost of manufacture of the present machine is far below the cost of conventional machines which are now used for separately removing lids and de-panning bread straps. Indeed, the simplicity of construction of the present machine is such that its cost of manufacture is substantially below conventional machines which simply de-pan bread straps while requiring manual de-lidding.

The present invention may be embodied in other specific forms and, accordingly, the above-described embodiment is to be considered in all respects merely as illustrative and not restrictive, reference being made to the appended claims, as indicative of the scope of this invention.

Having thus described my invention, I claim as new and desire to protect by Letters Patent the following:

1. A machine for de-lidding and de-panning pan straps each containing a plurality of side-by-side bread loaves or the like, said machine including a pair of transversely spaced longitudinally extending forwardly and downwardly inclined conveyor flights constructed and arranged to provide underlying support for the side rims of the lid of a pan strap, said conveyor flights being non-powered and being constructed and arranged to operate by gravity, a longitudinally extending conveyor flight disposed below and laterally intermediate the first-mentioned conveyor flights and constructed and arranged to provide underlying support for the pan strap, the last-mentioned conveyor flight being forwardly and downwardly inclined at a somewhat steeper angle than the first-mentioned flights, driving means for moving the pan strap and its lid forwardly and downwardly, the pan strap moving along the last-mentioned conveyor flight and the lid moving along the first-mentioned conveyor flights whereby the pan strap drops gradually relative to the lid, means for halting the pan strap after it has dropped clear of the lid whereby the lid is free to move by gravity along a downwardly-inclined path forwardly beyond the pan strap along the first-mentioned conveyor flights, means for releasing the halted pan strap, means for inverting the de-lidded pan strap to upside-down position and for depositing it upon spaced supports with sufficient force to knock the loaves free and to enable them to drop from the pan strap in inverted side-by-side position.

2. A construction according to claim 1 wherein the free lid is conveyed to tilting means for turning it to generally vertical position, and wherein mechanism is provided for depositing the lid upon a take-off conveyor while resting upon its forward edge.

3. A construction according to claim 1 wherein means are provided for re-inverting the emptied pan strap and for removing it in rightside-up position, and wherein means, synchronized with the pan strap re-inverting means, are provided for re-inverting the dumped loaves and for removing them in rightside-up position.

4. A construction according to claim 3 wherein the loaves-re-inverting means include a bread catcher for receiving the loaves in side-by-side upside-down position, said bread catcher being reciprocably pivotally mounted at one end whereby it can be swung downward from generally horizontal bread-receiving position to slightly beyond vertical bread-discharging position, the free end of said bread catcher being provided with a transverse bar about which the adjacent ends of the loaves pivot in the discharging position, thereby enabling the loaves to fall by gravity to rightside-up position.

5. A construction according to claim 1 wherein the means for re-inverting the de-lidded pan strap comprise a plurality of laterally spaced non-pivotally and rigidly mounted bed elements upon which the pan strap is adapted to fall when released, and a plurality of spaced reciprocably pivotally mounted lift members disposed in intermeshing relationship with the bed elements and constructed and arranged to raise the pan strap from the bed elements and to tilt it somewhat beyond vertical position, whereby the pan strap can fall from the raised tilted lift members at a point longitudinally spaced from the bed members.

6. A construction according to claim 5 wherein the bed members comprise a plurality of non-pivotally and rigidly mounted forwardly and downwardly inclined rods, and wherein the lift members are provided with pivotal mounting means adjacent the lower forward end of the bed rods and are also provided with a stop shoulder adjoining the mounting means for supporting the forward edge of the pan strap.

7. A construction according to claim 1 wherein the means for inverting the de-lidded pan strap comprises a plurality of laterally spaced lift members each of which is generally sector-shaped, each having a pair of angularly-related radial portions connected by an outer arcuate portion, the arcuate portions serving to halt the pan strap if said pan strap moves past the pan stop position before the lift members are fully lowered to strap receiving position.

8. A construction according to claim 7 wherein the pan strap inverting means also includes bed members which comprise a plurality of forwardly and downwardly inclined rods, and wherein the lift members are carried by a shaft reciprocably rotatably mounted adjacent the lower forward end of the bed rods.

9. A machine for de-lidding and de-panning pan straps each containing a plurality of side-by-side bread loaves or the like, said machine including a pair of transversely spaced longitudinally extending forwardly and downwardly inclined conveyor flights constructed and arranged to provide underlying support for the side rims of the lid of a pan strap, said conveyor flights being non-powered and being constructed and arranged to operate by gravity, a longitudinally extending conveyor flight disposed below and laterally intermediate the first-mentioned conveyor flights and constructed and arranged to provide underlying support for the pan strap, the last-mentioned conveyor flight being forwardly and downwardly inclined at a somewhat steeper angle than the first-mentioned flights, driving means for moving the pan strap forwardly and downwardly, the pan strap moving along the last-mentioned conveyor flight and the lid moving along the first-mentioned conveyor flights whereby the pan strap drops gradually relative to the lid, means for halting the pan strap after it has dropped clear of the lid whereby the lid is free to move by gravity along a downwardly-inclined path forwardly beyond the pan strap along the first-mentioned conveyor flights, means for releasing the halted pan strap, means for inverting the de-lidded pan strap to upside-down position and for depositing it upon spaced supports with sufficient force to knock the loaves free and to enable them to drop from the pan strap in inverted side-by-side position, means for re-inverting the emptied pan strap and for removing it in rightside-up position, means, synchronized with the pan strap re-inverting means, for re-inverting the dumped loaves and for removing them in rightside-up position, said last mentioned re-inverting means including a bread catcher for receiving loaves in side-by-side upside-down position, said bread catcher being reciprocably pivotally mounted at one end whereby it can be swung downward from generally horizontal bread-receiving position to slightly beyond vertical bread-discharging position, the free end of said bread catcher being provided with a transverse bar about which the adjacent ends of the loaves pivot in the discharging position, thereby enabling the loaves to fall by gravity to rightside-up position, and a supporting surface disposed just below the level of the bread catcher bar in discharging position, so that the loaves which fall from the bread catcher while resting upon said surface, extend upward beyond the level of the bread catcher bar, whereby the return movement of the bread catcher causes the bar to contact and shove the adjoining ends of the loaves and thereby to move the loaves, still in rightside-up side-by-side position, out of the path of the bread catcher.

10. A construction according to claim 9 wherein the supporting surface comprises a flight of rollers leading to a take-off conveyor, whereby return movement of the bread catcher transfers the side-by-side loaves to a take-off conveyor.

11. A machine for de-lidding and de-panning pan straps each containing a plurality of side-by-side bread loaves or the like, said machine including a pair of transversely spaced longitudinally extending forwardly and downwardly inclined conveyor flights constructed and arranged to provide underlying support for the side rims of the lid of a pan strap, said conveyor flights being non-powered and being constructed and arranged to operate by gravity, a longitudinally extending conveyor flight disposed below and laterally intermediate the first-mentioned conveyor flights and constructed and arranged to provide underlying support for the pan strap, the last-mentioned conveyor flight being forwardly and downwardly inclined at a somewhat steeper angle than the first-mentioned flights, driving means for moving the pan strap forwardly and downwardly, the pan strap moving along the last-mentioned conveyor flight and the lid moving along the first-mentioned conveyor flights whereby the pan strap drops gradually relative to the lid, means for halting the pan strap after it has dropped clear of the lid whereby the lid is free to move by gravity along a downwardly-inclined path forwardly beyond the pan strap along the first-mentioned conveyor flights, means for releasing the halted pan strap, means for inverting the de-lidded pan strap to upside-down position and for depositing it upon spaced supports with sufficient force to knock the loaves free and to enable them to drop from the pan strap in inverted side-by-side position, said last-mentioned de-panning means including a pair of side-by-side knock-out bar assemblies laterally adjustable toward and away from each other, each having a generally horizontal, rigidly and non-pivotally mounted member upon which the pan strap is adapted to be forcibly deposited in inverted position, and a pair of reciprocably pivotally mounted lift arms which are laterally adjustable in unison with the knock-out bar assemblies and which are constructed and arranged to be swung reciprocably between a lowermost generally horizontal position below the level of the horizontal knock-out members and an uppermost position somewhat beyond the vertical, whereby the inverted emptied pan strap is lifted from the knockout members, re-inverted and deposited by the lift arms, in rightside-up position, at a point spaced from the knock-out bar assemblies.

12. A construction according to claim 11 wherein a take-off conveyor is positioned below the delivery position of the lift arms so as to receive and remove the emptied pan strap in rightside position.

13. A construction according to claim 11 wherein the horizontal knock-out members are horizontally slotted so that each has a pair of laterally spaced portions, and wherein the lift arms fit within the slots intermediate the spaced portions when in lowermost horizontal position.

14. A construction according to claim 13 wherein the two lift arms are laterally adjustable along a pair of spaced horizontal transverse cylindrical rods, each rod having separate oppositely screw-threaded portions to which the lift arms are connected by threaded collars, said cylindrical rods being interconnected for simultaneous manual rotation so as to move the lift arms toward and away from each other while maintaining them in rigid parallel relationship with each other.

15. A construction according to claim 14 wherein each of the lift arms is provided with an angularly related portion into which the threaded sleeves are set, said portions being mounted on a reciprocably rotatable shaft for swinging the lift arms as aforesaid.

16. A construction according to claim 15 wherein the shaft for the lift arms is provided with drive means including a connecting link having lost motion mechanism for permitting dwell of the lift arms in lowermost generally horizontal position.

17. A construction according to claim 11 wherein the lift arms are mounted on a reciprocably rotated shaft, and wherein an open top bread catcher is disposed below the knock-out bar assemblies and is mounted at one end upon a second shaft which is geared to the first-mentioned shaft for opposite reciprocable rotation, said bread catcher being disposed in uppermost generally horizontal bread-receiving position when the lift arms are lowered, whereby the bread loaves dumped from the pan strap can fall beyond the knock-out bar assemblies and into the bread catcher in inverted side-by-side position, rotation of the two shafts causing the bread catcher to swing downward while the lift arms are swinging upward, said bread catcher moving to bread discharging position slightly beyond the vertical.

18. A construction according to claim 17 wherein the free end of the bread catcher is provided with a transverse bar about which the ends of the loaves pivot in the bread discharging position, whereby the loaves fall from the bread catcher in rightside-up side-by-side position.

19. A construction according to claim 18 wherein a supporting surface is provided just below the level of the bread catcher bar in discharging position so that the loaves falling from the bread catcher and resting upon said surface extend upward beyond the level of the bread catcher bar, whereby the return movement of the bread catcher causes the bar to contact and shove the adjoining ends of the loaves and to move the loaves, still in right-side-up side-by-side position, out of the path of the bread catcher.

20. A construction according to claim 19 wherein the supporting surface comprises a flight of rollers leading to a take-off conveyor, whereby return movement of the bread catcher transfers the side-by-side loaves to the take-off conveyor.

21. A construction according to claim 17 wherein the lift arms are mounted on their shaft by a pair of spaced supporting members which in turn carry a pair of spaced cylindrical rods, each rod having a pair of spaced oppositely-threaded portions, each lift arm being connected to a threaded portion of both rods by a pair of internally threaded sleeves, the rods being interconnected for simultaneous rotation, thereby to cause the two lift arms to move laterally toward and away from each other while remaining in rigid parallel relationship with each other.

22. A construction according to claim 21 wherein the knockout bar assemblies are loosely mounted on the lift arm shaft and are connected to the lift arms for lateral movement therewith.

23. A construction according to claim 22 wherein the knockout bar assemblies have slotted generally horizontal portions into which the lift arms fit, in recessed relationship, when in their lowered generally horizontal position.

24. In a machine of the character described, a de-panning mechanism comprising a rotatably mounted horizontal shaft, means for reciprocably rotating said shaft, a pair of spaced parallel supporting members mounted on and keyed to said shaft, a pair of spaced parallel cylindrical rods rotatably mounted upon said supporting members, means connecting said rods for rotation together, each of said rods having a pair of spaced oppositely screw-threaded portions, a pair of spaced lift arms, each lift arm being provided with a pair of threaded sleeves mounted upon the similarly threaded portions of both rods, whereby rotation of the two rods causes the two lift arms to move toward or away from each other while remaining in parallel relationship, and a pair of knockout bar assemblies non-pivotally journalled upon said shaft and constructed and arranged to move toward or away from each other simultaneously with said lift arms.

25. A construction according to claim 24 wherein each of the knock-out bar assemblies has a slotted portion, and wherein the lift arms are constructed and arranged to fit, in one position, within the slotted portions in recessed relationship thereto.

26. A construction according to claim 24 wherein a second rotatable shaft is mounted adjacent and parallel to the first mentioned shaft and is connected thereto so as to rotate simultaneously therewith, but in the opposite direction, said second shaft carrying a bread catcher disposed below the knock-out bar assemblies, said bread catcher reciprocably pivoting between uppermost generally horizontal bread receiving position and lowermost generally vertical bread dumping position.

27. A construction according to claim 26 wherein the two shafts are geared together so that the second shaft rotates through a somewhat greater angle than the first shaft, whereby the bread catcher in its lowermost position is tilted somewhat beyond the vertical to facilitate dumping of the bread.

28. A machine for de-lidding and de-panning pan straps each containing a plurality of side-by-side bread loaves or the like, said machine including a pair of transversely spaced longitudinally extending forwardly and downwardly inclined conveyor flights constructed and arranged to provide underlying support for the side rims of the lid of a pan strap, said conveyor flights being non-powered and being constructed and arranged to operate by gravity, a longitudinally extending conveyor flight disposed below and laterally intermediate the first-mentioned conveyor flights and constructed and arranged to provide underlying support for the pan strap, the last-mentioned conveyor flight being forwardly and downwardly inclined at a somewhat steeper angle than the first-mentioned flights, driving means for moving the pan strap forwardly and downwardly, the pan strap moving along the last-mentioned conveyor flight and the lid moving along the first-mentioned conveyor flights whereby the pan strap drops gradually relative to the lid, means for releasably halting the pan strap after it has dropped clear of the lid whereby the lid is free to move by gravity along a downwardly-inclined path forwardly beyond the pan strap along the first-mentioned conveyor flights, said pan strap halting means including an uppermost generally horizontal transverse bar mounted at the lower forward end of the pan strap conveyor flight, a lever assembly connected at one end to said transverse bar, means for reciprocally tilting said lever assembly to raise and lower the transverse bar, and a damping mechanism provided on the other end of the lever assembly to minimize bounce of the lever assembly and the rod when moved to pan stopping position, means for inverting the de-lidded pan strap to upside-down position and for depositing it upon spaced supports with sufficient force to knock the loaves free and to enable them to drop from the pan strap in inverted side-by-side position.

29. A construction according to claim 28 wherein the damping mechanism includes a transverse bar of iron or the like mounted upon the aforesaid other end of the lever assembly, and a magnet mounted adjacent said iron bar and constructed and arranged releasably to hold the iron bar when said iron is lowered into adjoining relationship to the magnet.

References Cited in the file of this patent

UNITED STATES PATENTS

| | | |
|---|---|---|
| 1,306,477 | Frey | June 10, 1919 |
| 2,247,175 | Orstrom | June 24, 1941 |
| 2,682,961 | Winfree et al. | July 6, 1954 |
| 2,704,614 | St. John et al. | Mar. 22, 1955 |
| 2,715,973 | Winfree et al. | Aug. 23, 1955 |
| 2,738,912 | Kieffaber | Mar. 20, 1956 |